United States Patent [19]

Counter et al.

[11] Patent Number: 4,714,917

[45] Date of Patent: Dec. 22, 1987

[54] APPARATUS FOR DETECTING CRACKS IN A FLEXIBLE COUPLING

[75] Inventors: Louis F. Counter, Greendale; Richard C. Born, Wauwatosa; LeRoy M. Walters, Milwaukee; Lowell B. Ziese, Greendale; Lawrence G. Searing, Milwaukee, all of Wis.

[73] Assignee: Rexnord Inc., Brookfield, Wis.

[21] Appl. No.: 917,765

[22] Filed: Oct. 10, 1986

[51] Int. Cl.$^4$ ............................................. G08B 21/00
[52] U.S. Cl. ........................................ 340/679; 464/23
[58] Field of Search ............. 340/679, 648, 652, 52 R; 464/78, 93, 99, 23

[56] References Cited

U.S. PATENT DOCUMENTS

| | | | |
|---|---|---|---|
| 1,789,862 | 1/1931 | Bricken | 464/23 |
| 3,654,775 | 4/1974 | Williams | 464/99 |
| 3,786,776 | 1/1974 | Buthe et al. | 464/23 |
| 4,055,966 | 11/1977 | Fredericks | 464/99 |
| 4,254,415 | 3/1981 | Kaufman | 340/679 |
| 4,276,758 | 7/1981 | Coman et al. | 464/23 |
| 4,398,173 | 8/1983 | Kulischenko et al. | 340/52 R |

Primary Examiner—James L. Rowland
Assistant Examiner—Tat K. Wong
Attorney, Agent, or Firm—Richard C. Ruppin

[57] ABSTRACT

An apparatus for detecting cracks in a flexible rotating coupling is disclosed in which the flexible coupling includes a flexible element having a plurality of flexible discs. An electrically conductive, normally continuous, line is affixed to at least one of the flexible discs and connected to a circuit. The conductive line becomes discontinuous if the disc cracks. The circuit is mounted on the coupling and transmits a signal indicative of the continuous or discontinuous condition of the conductive line and thereby the intact or cracked condition of the flexible disc. The transmitted signal is received by a stationary circuit which provides an output indication of the disc's intact or cracked condition.

19 Claims, 14 Drawing Figures

APPARATUS FOR DETECTING CRACKS IN A FLEXIBLE COUPLING

FIELD OF THE INVENTION

This invention relates to an apparatus for detecting cracks in a rotating flexible coupling and more particularly to such an apparatus for transmitting signals indicative of a crack in a flexible element from the rotating flexible coupling to a stationary receiver.

BACKGROUND OF THE INVENTION

Flexible torque transmission couplings are old and well-known devices for transmitting rotary power under conditions in which misalignment exists between the rotating power source and the machine receiving the rotating power. Flexible couplings employing one or more flexible elements consisting of an integral, single piece of material or comprising separate flexible discs layered together, and other components connected together are widely used. An example of an integral, single element flexible coupling is disclosed in U.S. Pat. No. 3,071,942, issued Jan. 8, 1963. An example of a flexible coupling comprising a number of flexible layered discs and connecting members to provide an overall coupling structure is disclosed in U.S. Pat. No. 2,745,267, issued May 15, 1956.

As a result of the stresses on the flexible coupling during its operation, including stresses due to misalignment of the power source and the driven device, cracking occurs in the flexible disc layers over a period of time and ultimately the entire flexible member and thereby the flexible coupling itself fails. The failure of the coupling may result in further damage to itself as it rotates in a failed mode, thus increasing the cost of its repair. The failure may also occur at a time when continuous operation of the device driven by the power source is critical and the resulting shut-down would be extremely costly in a processing or manufacturing operation. Consequently, there is an important need for a means for detecting cracks in the flexible discs of the coupling at an early time in their occurrence before failure of the entire coupling occurs or shutdown of an entire production line is necessary.

SUMMARY OF THE INVENTION

It is a general object of this invention to provide an apparatus for detecting cracks in flexible discs of flexible couplings and which gives an indication of the existence of the crack.

The invention is accomplished by providing apparatus for detecting cracks in a flexible disc of a flexible coupling in which the apparatus includes an insulated conductive line on the flexible disc that becomes discontinuous and non-conductive upon cracking of the disc. A circuit means is mounted on the coupling and connected to the conductive line for generating and transmitting a first signal while the conductive line is continuous and a second signal while the conductive line is discontinuous. A stationary circuit means receives the signals from the circuit means mounted on the flexible coupling and provides output signals indicative of the receipt of either one of the signals.

Where the flexible coupling has a plurality of layered flexible discs, the coupling's position relative to the power source and driven device before and after the cracking of a disc will normally be the same. The flexible coupling as a whole will remain intact because all of the discs generally will not crack simultaneously. In essence, the crack detector senses incipient failure of the flexible coupling due to disc cracking.

The circuit means mounted on and rotating with the flexible coupling may receive power transmitted from the stationary circuit means and use this transmitted power for generating the first and second signals. In another embodiment, the circuit means on the flexible coupling may include a power source mounted on the flexible coupling. The stationary circuit means may also include an antenna for receiving the first and second signals and, in the first embodiment, the stationary circuit means includes an antenna for both receiving the first and second signals and transmitting high frequency power to the rotating circuit means.

BRIEF DESCRIPTION OF THE DRAWINGS

Further objects and advantages of the invention will appear when taken in conjunction with the accompanying drawings, in which.

DETAILED DESCRIPTION OF THE INVENTION

Figure 1A:
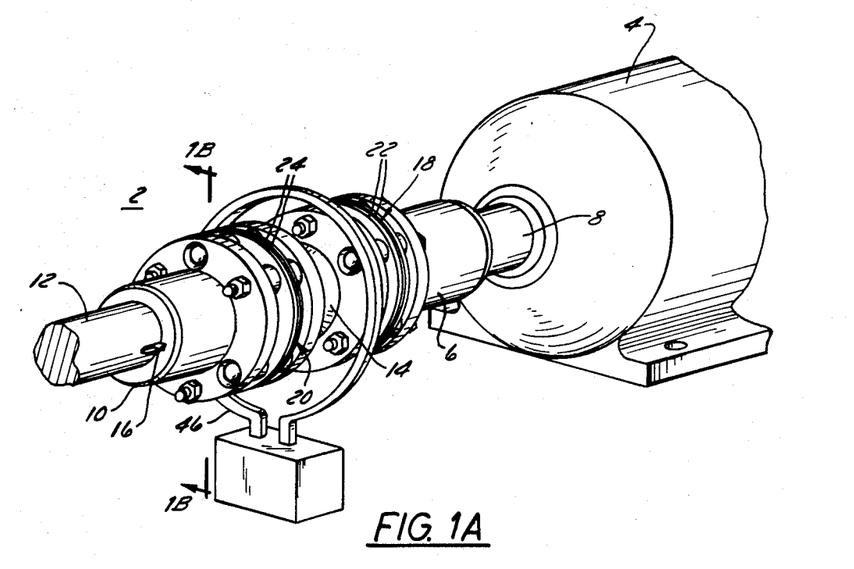
FIG. 1A is a perspective view of the flexible coupling and the crack detecting apparatus according to the invention.
Figure 1B:
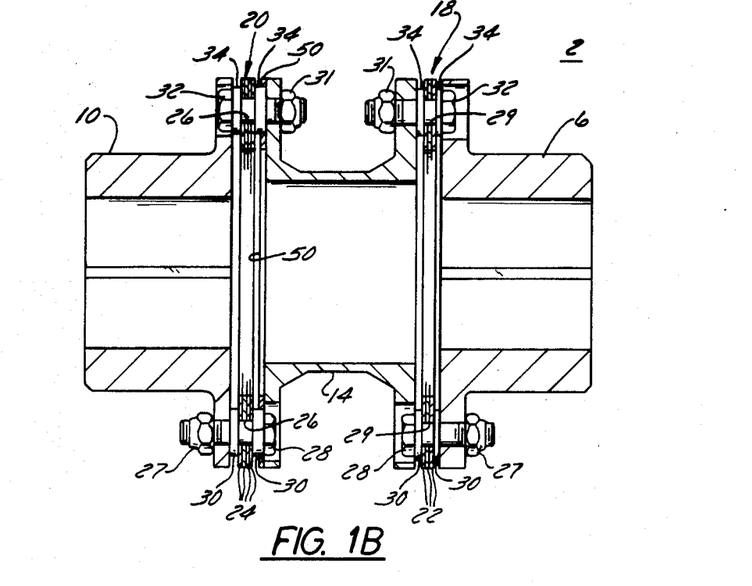
FIG. 1B is a side elevation view, partly in cross-section, of the flexible coupling and crack detecting apparatus taken through lines 1B—1B of FIG. 1A.

With reference to FIG. 1, a flexible coupling 2 is illustrated connected between a rotary power source such as a motor 4 and a driven device (not shown) for transferring the rotary power from the power source to the driven device. The primary function of the flexible coupling 2 is to transfer power from the rotary power source to the driven device while at the same time accommodating any misalignment between the shaft 8 of the power source and the shaft 12 of the driven device on which the flexible coupling is mounted.

The flexible coupling 2 includes a hub member 6 affixed to the shaft 8, a hub member 10 affixed to the shaft 12 of the driven device, and a center member 14 positioned between the two hub members 6 and 10. The hub members 6 and 10 are held in place on the respective shafts 8 and 12 by key means 16 on each shaft such as key means 16 shown on shaft 12 only. A flexible member 18 is positioned between the hub member 6 and the center member 14 and a flexible member 20 is positioned between the hub member 10 and the center member 14. The flexible member 18 comprises a plurality of thin discs 22, arranged in a layered fashion, and the flexible member 20 comprises a plurality of thin discs 24, also arranged in a layered fashion. The flexible member 20 and therefore each of its laminated discs 24 has a plurality of openings 26 spaced apart circumferentially for purposes of mounting the flexible member on the hub member 10 and center member 14. Nuts 27, bolts 28 inserted through openings 26 in member 20, and spacing washers 30 are utilized to attach the flexible member 20 to the hub member 10 and nuts 31, bolts 32 inserted through the openings 26 in member 20, and spacing washers 34 are utilized to attach the member 20 to the center member 14. The mounting locations of the flexible member 20 on the hub member 10 are angularly spaced between the mounting locations of the flexible member 20 to the center member 14 to permit maximum flexibility of the flexible member 20 between the hub 10 and center member 14. The flexible member 18 and therefore each of its discs 22 has a plurality of openings 29 spaced apart circumferentially for purposes of mounting the flexible member 18 on the hub member 6 and center member 14. The flexible member 18 is attached to the hub member 6 also utilizing bolts 28, nuts 27 and spacing washers 30 and attached to the center member 14 utilizing nuts 31, bolts 32 and spacing washers 34. The mounting locations of the flexible member 18 on the hub 6 are angularly spaced between the mounting locations of the flexible member 18 on the center member 14 to permit maximum flexibility of the flexible member 18 between the hub 6 and center member 14.

As previously stated, a function of the flexible coupling 2 is to accommodate misalignment between the respective shafts 8 and 12 of the power source and driven device while they are in rotary motion. In positioning the power source and the driven device, effort is made to place the shafts 8 and 12 and the flexible coupling 2 in alignment with each other. However, if the shafts are somewhat out of alignment the flexible coupling 2 will be required to flex to the extent necessary to provide the rotary power transfer connection between the two shafts. As the two shafts rotate, any misalignment between them results in continuous flexing of the flexible members 18 and 20 and thus a substantial amount of stress on the flexible members 18 and 20 and their individual discs 22 and 24. Ultimately, this stress will result in the cracking of the discs and the failure of the flexible coupling 2. The cracking of discs typically occurs gradually with the outer two discs initially cracking and the cracking of other discs occuring over a period of time such that the flexible members 18 or 20 are, as a whole, intact at least after the initial cracking of an outer disc. Thus, the flexible coupling 2 has a normal operating angular position relative to the shaft 8 of the motor 4 and the shaft 12 of the driven device before initial cracking of a disc and continues in this same position after the initial cracking of the disc. The angular position of the flexible coupling 2 relative to the motor and driven device is thus independent of the cracking of the disc.

Figure 2A:
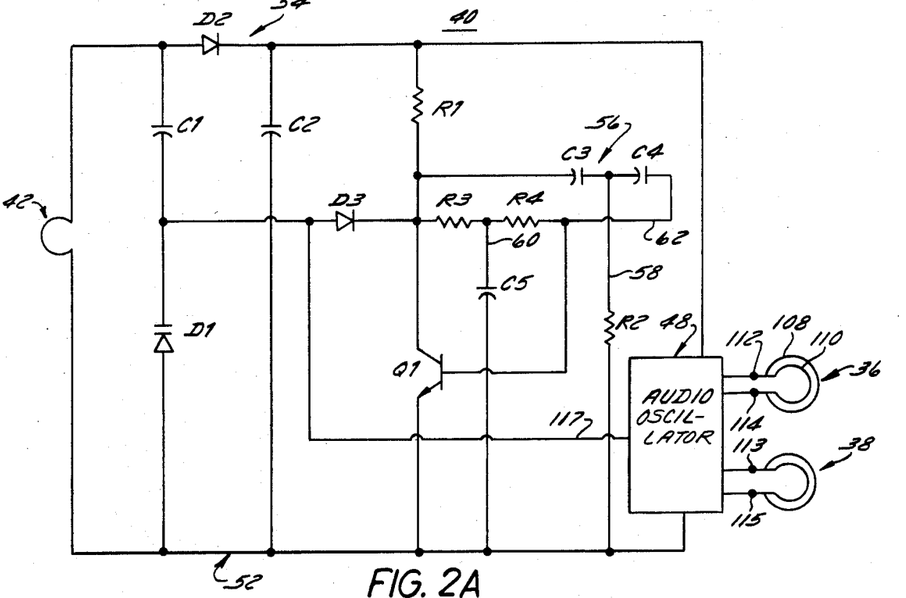
FIG. 2A is a schematic circuit diagram of the coupling mounted transponder circuit portion of the crack detecting apparatus.
Figure 2B:
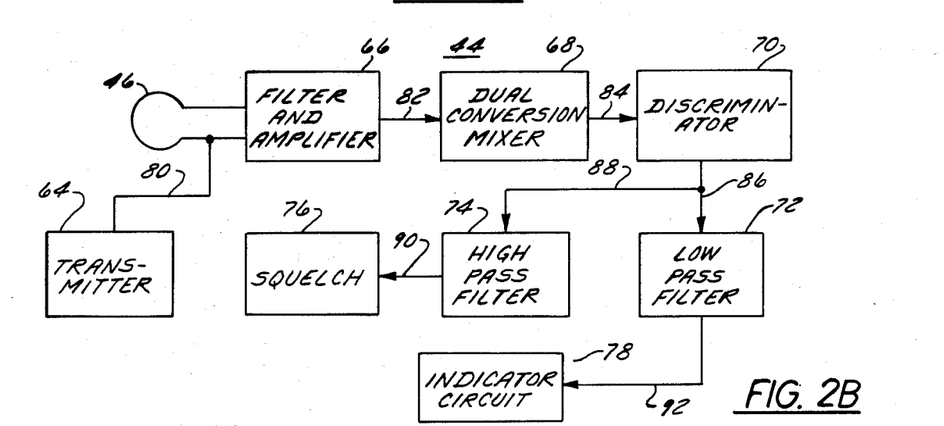
FIG. 2B is a block circuit diagram of the stationary transceiver circuit of the apparatus.
Figure 4A:
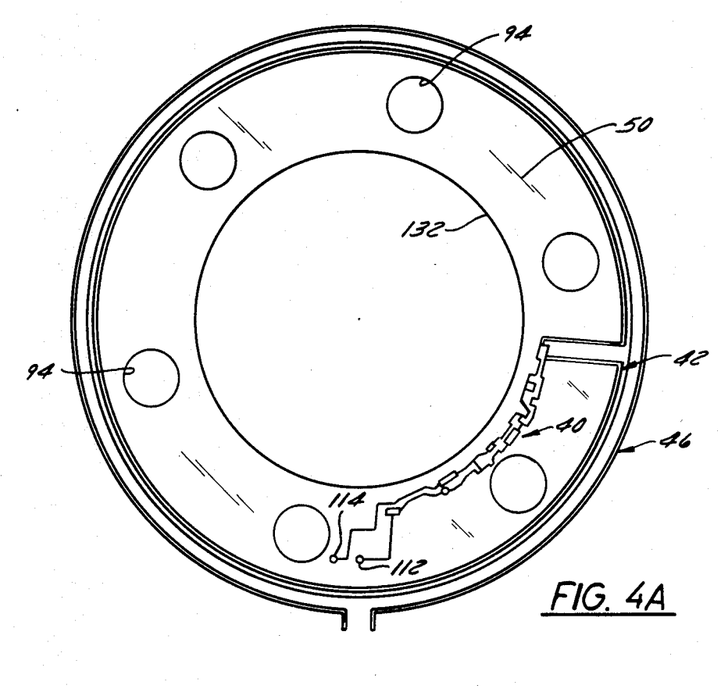
FIG. 4A is a view of a printed circuit board which is mounted on the coupling and to which is affixed the rotating transponder circuit and antenna.

As shown in FIGS. 2A and 2B, the apparatus for detecting cracks in the discs includes a first or transponder circuit 40, an antenna 42, a second or stationary transceiver circuit 44, an antenna 46, an insulated electrically conductive line 36 affixed to a disc 24 of flexible member 20 and an insulated electrically conductive line 38 similarly affixed to a disc 22 of flexible member 18. Each disc 22 comprising a part of flexible member 18 is identical and performs similarly to a disc 24 and therefore is not shown in detail and will be further described only with respect to its cracking. The conductive lines 36 and 38 are illustrated in FIG. 2A and the line 36 and disc 24 are also illustrated in other drawing figures. The circuit 40 is mounted on the coupling and connected to the conductive lines 36 and 38. The antenna 42 as well as the circuit 40 may be mounted on one of the hubs or on the center member 14. In the embodiment of the invention shown in FIGS. 1A and 1B, the circuit 40 and antenna 42 are affixed to a printed circuit board 50 which is mounted by means of an adhesive on the center member 14. The board 50 includes openings 94 permitting passage of bolts 28 and 32. The board 50 is mounted coaxially with the rotating axis of the flexible coupling 2 and, as shown in FIG. 4A, is shaped such that its weight is distributed evenly about the axis of the coupling 2.

The conductive lines 36 and 38 are affixed to a disc, in a manner which is described in greater detail hereinafter, such that when the disc cracks beneath the conductive line, the line will break and become electrically discontinuous. The discontinuity of the conductive line will cause a change in the output signal of the circuit on the flexible coupling in which the line is connected such as transponder circuit 40 or the encoder/transmitter 120 shown in the embodiment of the invention illustrated in FIG. 3.

In the embodiment of the invention illustrated in FIGS. 2A and 2B, the transponder circuit 40 includes a resonant frequency circuit 52 having a varactor diode D1 and a capacitor C1 connected across antenna 42. A Schottky diode D2 acts as a half-wave rectifier and a filtering capacitor C2 provides a DC voltage to a twin-tee oscillator 56. The oscillator section 56 includes a tee filter 58 comprising resistor R2 and capacitors C3 and C4, a second tee filter 60 comprising resistors R3 and R4 and capacitor C5, and a transistor Q1 connected to a collector load resistor R1. An audio oscillator 48 is connected to terminals 112, 114 of conductive line 36 and to terminals 113, 115 of conductive line 38. The oscillator 48 produces a high first audio frequency signal on line 117 when both discs 22 and 24 are intact and conductive lines 36 and 38 are both continuous and a low second audio frequency signal when one or both of the discs 22 and 24 cracks and either one or both of the conductive lines 36 and 38 becomes discontinuous, that is, open circuited.

The stationary second circuit 44 may be portable or permanently mounted, however, it is stationary in the sense that it does not rotate with the flexible coupling 2. As illustrated in FIGS. 1A and 1B, the stationary antenna 46 is positioned to transmit power to and receive signals from the antenna 42 rotating with the coupling 2. In FIG. 2B, the stationary circuit 44 is shown as including a transmitter 64 connected by a circuit connection represented by line 80 to antenna 46 and generating the radio frequency power for transmission to the transponder first circuit 40, a filter and amplifier 66 connected to the antenna 46, a dual conversion mixer 68 having an IF output to a discriminator 70, a low bandpass filter 72 and high bandpass filter 74, a squelch circuit 76, and an indicator circuit 78. The filter and amplifier 66 includes a resonant frequency circuit inductively coupled to the antenna 46, a filter for passing the frequency of transmitter 64 from antenna 46 to ground, an RF amplifier and filter connected to amplify only the received signal from the antenna 42 on circuit 40, suitable RF decoupling networks to minimize RF interference and a resistor-inductor narrow bandpass network for filtering the received signal. The received signal from the filter and amplifier 66 is fed to the mixer 68 through a circuit connection represented by the line 82. The circuit 68 includes an oscillator, FET mixer, and a narrow bandpass filter network and provides an IF output to the line 84. The line 84 represents a circuit connection between the mixer 68 and a discriminator 70. Both the mixer 68 and the discriminator 70 may be part of an integrated circuit such as an MC3361 manufactured by Motorola. The discriminator circuit 70 provides the audio signal contained in the received signal to a low pass filter 72 and high pass filter 74 through the circuit connection represented by lines 86 and 88 connected to, respectively. The high pass filter 74 is connected through a circuit connection represented by line 90 to the squelch circuit 76 and the low pass filter is connected through a circuit connection represented by line 92 to an indicator circuit 78. When no audio signal from the discriminator 70 is present, the higher frequencies of the noise that is present will pass through the high pass filter 74 and activate the squelch circuit 76. While the squelch circuit 76 is activated, the output of the low pass filter 72 on line 92 to the indicator circuit 78 is maintained at a low impedance to ground to thereby prevent any signal from reaching the indicator. When either the high or low frequency audio signal from the discriminator 70 is present on lines 88 and 86, the squelch circuit 76 will be inactive and the impedance to ground of the filter 76 at line 92 is high. The audio signal on line 92 is consequently applied to the indicator circuit 78 which provides an appropriate indication of the presence of either the high or the low audio frequency signal. The indicator circuit 78 may, for example, include a light emitting diode which is on only when a high audio frequency signal is received on line 92 and a light emitting diode which is on only when a low audio frequency signal is received on line 92.

In the operation of the crack detector apparatus illustrated in FIGS. 2A and 2B, radio frequency power at 49.86 MHz transmitted by the stationary circuit 44 through the antenna 46 is received by the antenna 42 from the stationary circuit 44. The resonant frequency circuit 52 is tuned to be resonant at approximately 49.86 MHz and passes power at this frequency on to the half-wave rectifier section 54. The Schottky diode D2 rectifies the 49.86 MHz power signal and it is filtered by the capacitor C2 to thereby provide a DC voltage to the oscillator section 56. The oscillator 56 generates a frequency signal at its notch point 62 which is determined by the values of the resistors and capacitors of the two tee sections 58 and 60. The frequency signal from the oscillator 56 and the received frequency of 49.86 MHz are mixed across diode D3 to produce a carrier frequency of 49.89 MHz. This enables the stationary transmitter/receiver circuit 44 to differentiate between the signal of 49.86 MHz which it transmits to provide power to the rotating transponder circuit 40 and the signal which it receives from the circuit 40. As previously described, the audio oscillator 48 is connected to terminals 112 and 114 of insulated conductive line 36 and to terminals 113 and 115 of insulated conductive line 38. When the discs 22 or 24 are not cracked and the conductive lines are consequently continuous as shown in FIG. 2A, the output of the audio oscillator 48 on line 117 will be at a first audio frequency signal of 1.4 KHz. When either one or both of the conductive lines 36 and 38 become discontinuous due to a crack in one or both of their respective associated discs 22 and 24, the audio frequency output on line 117 will be at a second audio frequency signal of 1.0 KHz. The 1.0 or 1.4 KHz signals are applied across varactor diode D1 to cause the modulation of the 49.89 MHz carrier frequency. The amplitude of the two audio frequencies is such that they both continuously modulate the carrier of 49.89 MHz to a modulated frequency range of from 49.886 to 49.894 MHz. The rate of change between 49.886 and 49.894 MHz, however, will be either at the first or second audio frequency of 1.4 KHz or 1.0 KHz, depending on the continuous or discontinuous condition of the conductive lines 36 and 38. The modulated carrier signal of 49.886 to 49.894 MHz appears across the antenna 42 which transmits it to the stationary antenna 46 of the circuit 44.

At the stationary transmitter/receiver circuit 44, with reference to FIG. 2B, the received 49.886 to 49.894 MHz signal is fed to the filter and amplifier circuit 66 where it is amplified and passed through a narrow bandpass filter. Also, in the circuit 66, any of the transmitted 49.86 MHz signal entering the circuit 66 is passed to ground. When there is no audio signal, that is, when the 49.89 MHz carrier received by stationary circuit 44 has not been modulated by either the 1.4 KHz or 1.0 KHz audio signal, the squelch circuit 76 prevents any signal from reaching the indicator circuit 78. However, when the received carrier frequency is modulated by the audio signal, so that the received signal is either 49.886 or 49.894 MHz, the squelch circuit 76 permits a signal to be fed to the indicator circuit 78 to cause energizing of a light emitting diode to thereby indicate either that a disc has cracked and a conductor on the disc is discontinuous or that the discs are intact and all conductors are continuous.

Figure 3:
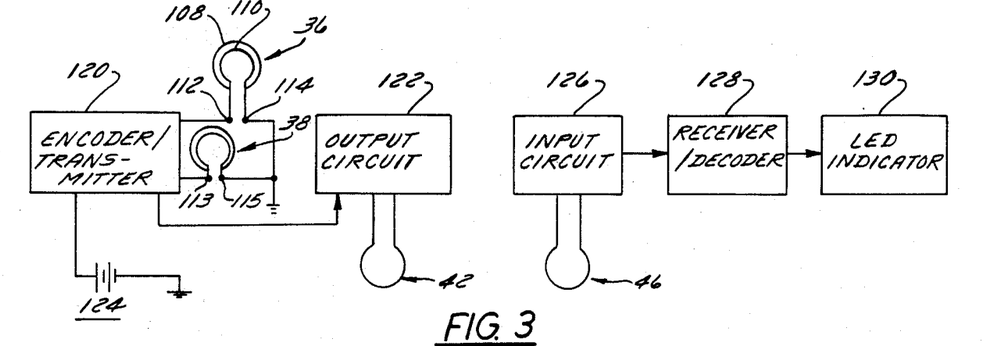
FIG. 3 is a block circuit diagram of another embodiment of the invention illustrating both the coupling mounted encoder/transmitter circuit and a stationary receiver/decoder circuit.

Another embodiment of the invention is shown in FIG. 3 and is intended for use with a battery power source carried on the coupling 2 rather than with transmitted radio frequency power as in the embodiment shown in FIGS. 2A and 2B. The crack detector apparatus of FIG. 3 includes an encoder/transmitter circuit 120 mounted on the coupling 2 and connected to insulated conductive line 38 at terminals 113 and 115 and to insulated conductive line 36 at terminals 112 and 114, an output circuit 122 connected between the circuit 120 and the antenna 42 on the coupling 2 and a power supply 124 mounted on the coupling 2 for supplying power to the encoder/transmitter 120. The apparatus as shown in FIG. 3 further includes a stationary input circuit 126 connected to the stationary antenna 46, a stationary receiver/decoder 128 connected between the imput circuit 126 and an LED indicator 130.

The rotating encoder/transmitter circuit 120 includes a digital proportional encoder and radio frequency transmitter, such as the LM1871 encoder/transmitter integrated circuit manufactured by National Semiconductor Corporation, and auxiliary circuit components external to the integrated circuit. The auxiliary circuit components include resistor-capacitor networks for setting the time width of signal pulses generated by the encoder/transmitter 120 and the frame time during which each series of signal pulses is transmitted, a crystal resonator for setting the transmitting frequency of the encoder/transponder 120, and decoupling circuits for eliminating undesired frequencies in the power supply 124 and output circuits 122. The output circuit 122 comprises a resonant frequency circuit which serves as a load for the signal pulses from the encoder/transmitter 120 and an impedance matching circuit for matching the impedance of the antenna 42 to the output impedance of the encoder/transmitter 120. The power supply 124 comprises a suitable D.C. source such as a battery mounted on the coupling 2. The stationary input circuit 126 includes a resonant frequency circuit tuned to the frequency transmitted by the encoder/transmitter 120, and an impedance matching circuit for matching the impedance of the antenna 46 to that of the receiver/decoder 128. The receiver/decoder circuit 128 comprises a digital integrated circuit receiver and decoder, such as the LM1872 receiver/decoder integrated circuit manufactured by the National Semiconductor Corporation, and auxiliary circuit components external to the integrated circuit. The auxiliary circuit components include a crystal resonator and resonant frequency circuits for demodulating the pulse signals received from the encoder/transmitter 120, and decoupling circuits for eliminating undesired frequency components in the power supply, impedance matching, resonator and demodulating circuits. The receiver/decoder 128 is connected to a light emitting diode indicator 130 and will produce an output signal to the LED indicator 130 dependent on the number of pulse signals the receiver/decoder 128 receives from the decoder/transmitter 120 which are indicative of the continuous or discontinuous condition of the conductive lines 36 and 38. The LED indicator 130 thus will indicate the intact or cracked condition of the discs to which the conductive lines are attached. The encoder/transmitter 120, the power supply 124, the output circuit 122, the input circuit 126, the receiver/decoder 128 and the LED indicator 130 all contain well known circuit components which are connected and function in a well known manner and consequently they will not be described in further detail.

The encoder/transmitter 120 has two analog channels and two digital channels. During each time frame, both analog information pulses are transmitted followed by one to four digital pulses or a total of three to six pulses depending on the information the digital pulses convey. The presence of only one digital pulse after the analog pulse indicates that neither digital channel is on, two digital pulses indicate that one channel is on, three digital pulses indicate that the other digital channel is on, and four digital pulses indicate that both digital channels are on. It may be noted that, although the two analog channels are available in the aforementioned LM1871 integrated circuit, they are not actually utilized in the embodiment of the invention disclosed herein. The digital output pulse signal states are determined by the continuity or discontinuity of the conductive lines 36 and 38. Thus, if the flexible discs 24 and 22 to which the conductive lines 36 and 38 are respectively attached are not cracked so that the lines 36 and 38 are continuous, four digital pulse signals will be present at the output of the encoder/transmitter 120 and transmitted through the antenna 42 to the receiver/decoder 128. If one of the conductive lines 36 or 38 becomes discontinuous due to a crack in the disc to which it is attached, the encoder/transmitter 120 will have a three digital pulse output which will be transmitted to the receiver/decoder 128 and if the other conductive line 38 becomes discontinuous, the encoder/transmitter 120 will have a two digital pulse output that will be transmitted to the receiver/decoder 128. If both conductive lines 36 and 38 become discontinuous, the signal pulse output of the encoder/transmitter 120 will be one digital pulse which will be transmitted to the receiver/decoder 128. The signal pulses are received at the receiver/decoder 128 and decoded such that, depending on the number of pulses received, the receiver/decoder 128 will produce an output to the indicator 130 which will switch the on/off condition of a pair of light emitting diodes each corresponding to one of the conductive lines 36 and 38 to indicate whether the conductive lines are continuous or discontinuous.

Figure 5:
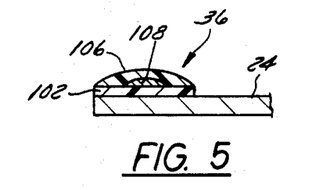
FIG. 5 is a cross-section elevation view of a crack detecting conductive line affixed to a flexible disc of the coupling.

The insulated conductive lines 36 and 38 are connected to the rotating circuits 40 or 120 and attached to a flexible disc in an identical manner and therefore only the connection and attachment of one of the conductive lines will be described in detail. With reference to FIG. 5, illustrating the insulated conductive line 36, a layer of electrically insulating material 102 such as an epoxy or polymer is coated onto the flexible disc 24 with a conductive line or layer of material 108 being applied to the insulating layer 102. A second electrically insulating layer 106 covers the conductive line 108 and also serves to protect the conductive line from damage and corrosion.

Figure 6:
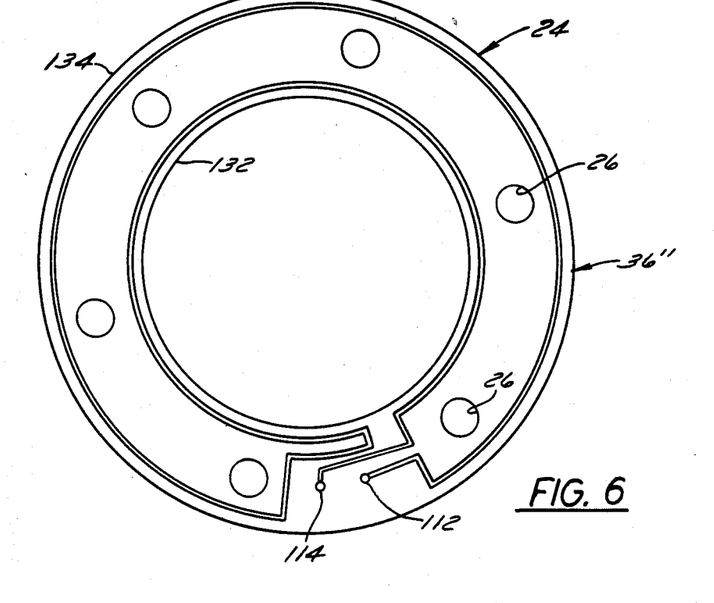
FIG. 6 illustrates a flexible disc of the coupling in which two conductive lines in parallel are affixed to the disc.

The insulated conductive lines 36 and 38 preferably have a shape and location on a flexible disc such that any crack developing will be detected at an early time. One desirable location and shape is the single line arrangement shown in FIG. 6. In FIG. 6, the insulated conductive line 36 comprises a single continuous line attached to disc 24 and lying along both the inner periphery 132 and outer periphery 134 of the disc. the ends of the line 36 are connected to the terminals 112 and 114 of the transponder circuit 40 illustrated in FIG. 2A. Alternatively, the ends of conductor 36 may be attached to terminals 112 and 114 of the encoder/transmitter circuit 120 illustrated in FIG. 3. With the conductive line 36 being located adjacent the inner periphery 132 and the outer periphery 134 of the flexible disc 24, at an early time in the development of a crack at either the inward or outward peripheral edges of the disc 24, the line will become open circuited or discontinuous. This open circuiting of the line 36 is sensed by the circuit means 40 or the encoder/transmitter 120 which cause a change in the transmitted signal to thereby indicate the initiation of a crack in the disc.

Figure 7:
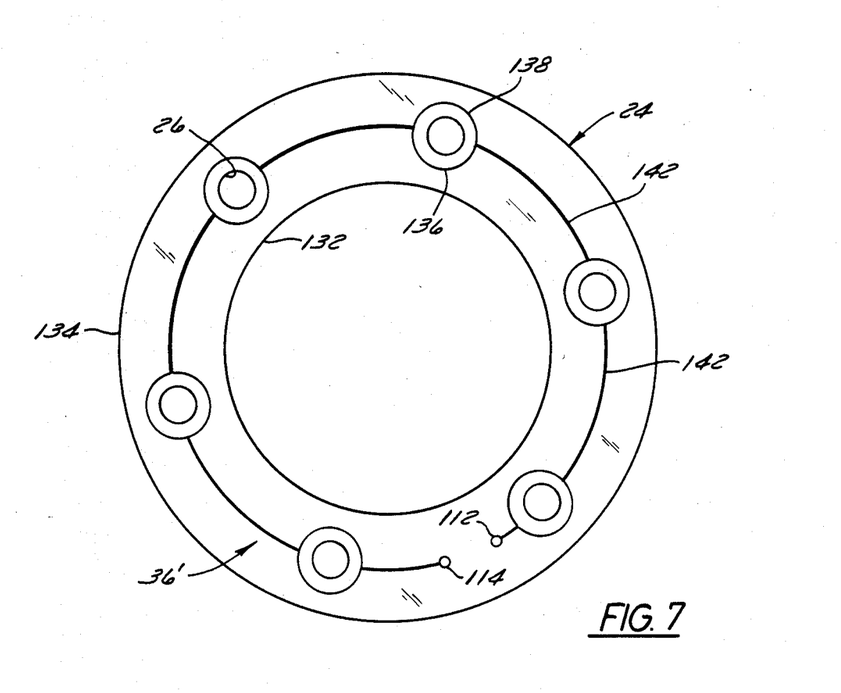
FIG. 7 illustrates another embodiment of the invention in which the conductive line for detecting a crack in the disc has a combined series parallel arrangement.

With reference to FIG. 7, in another embodiment of the invention, insulated conductive line 36', comprises a pair of conductors 136 and 138 connected in parallel around the openings 26 in the disc 24 and a plurality of conductors 142 connecting the pairs of parallel conductors 136 and 138 in series to the terminals 112 and 114 of circuit 40 or, as shown in FIG. 3, of circuit 120. Cracks most frequently develop in a disc 24 at the high stress points surrounding openings 26 where the disc is attached to a hub or center member. Consequently, most cracks will be detected at an early time by the conductors 136 and 138 surrounding the openings 26. Thus, the parallel/series pattern illustrated in FIG. 7 provides early detection of cracks while at the same time permitting use of less conductive and insulating material.

Figure 8:
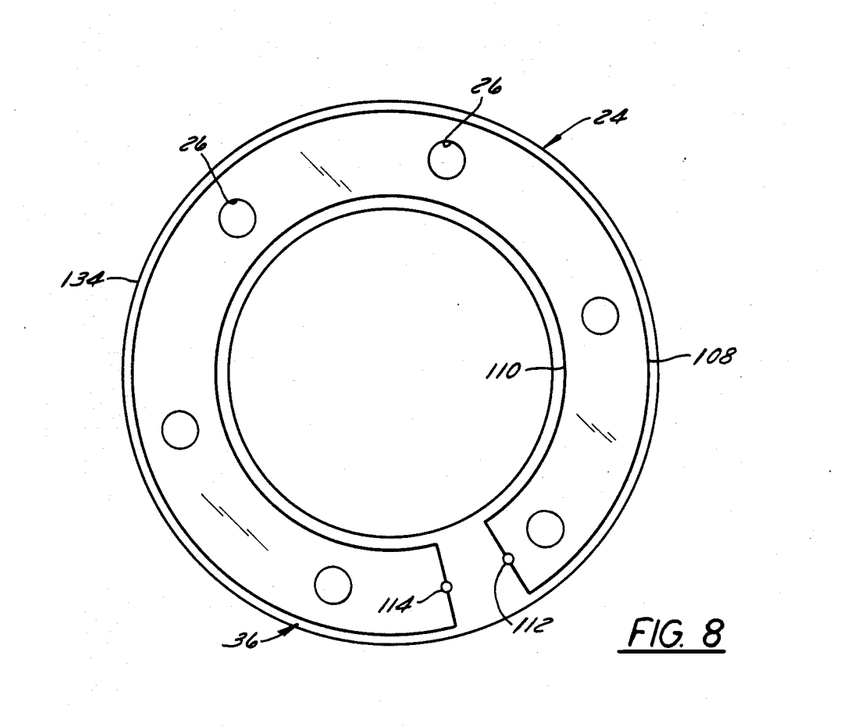
FIG. 8 illustrates another embodiment of the invention in which the conductive line for detecting a crack in the disc is in series along its full length on the disc.

FIG. 8 illustrates a further embodiment of the invention in which the conductive line 36" comprises a parallel conductive line arrangement in which the conductive line 36 comprises conductors 108 and 110 attached to disc 24 and connected in parallel to the terminals 112 or 114 of either transponder circuit 40 or encoder/transmitter circuit 120.

In FIG. 4A, the stationary and rotating antennas 46 and 42 respectively are shown as having a loop configuration. The antenna 42 is affixed to the printed circuit board 50 along its outer periphery and the antenna 46 is mounted adjacent to and surrounding the coupling 2 on which the printed circuit board 50 and antenna 42 are mounted. The benefit of the loop antenna configuration is that there will be no signal transmission "dead spots" as the flexible coupling 2 rotates and this may be of importance where the shaft 8 cannot be easily turned when the crack detecting apparatus is being tested for proper operation and the rotary power source 4 is not operating. The loop antenna configuration, however, has the drawback that it cannot be easily installed and removed and, if not removed, makes the installation or removal of the flexible coupling 2 more difficult.

Figure 4B:
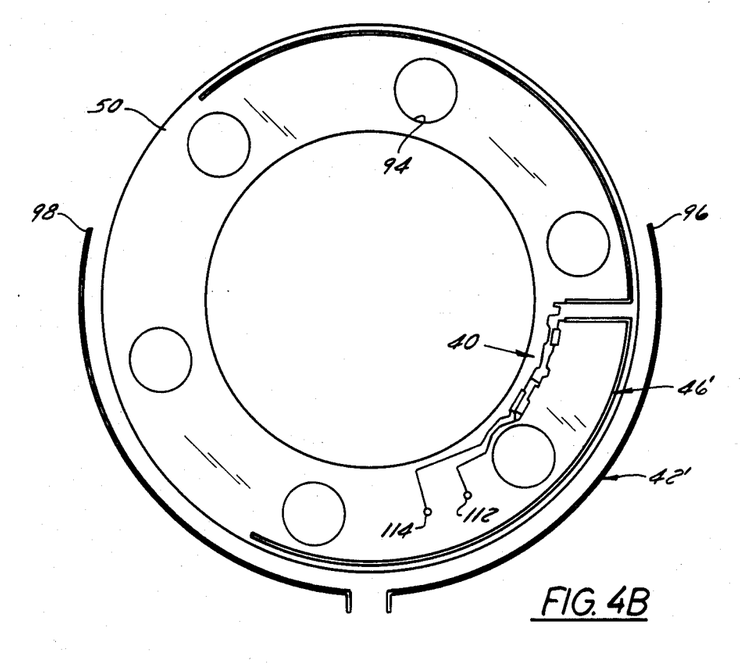
FIG. 4B is a view of a printed circuit board illustrating an alternate embodiment of the invention having a different type of rotating antenna and a stationary antenna adjacent the coupling.
Figure 4C:
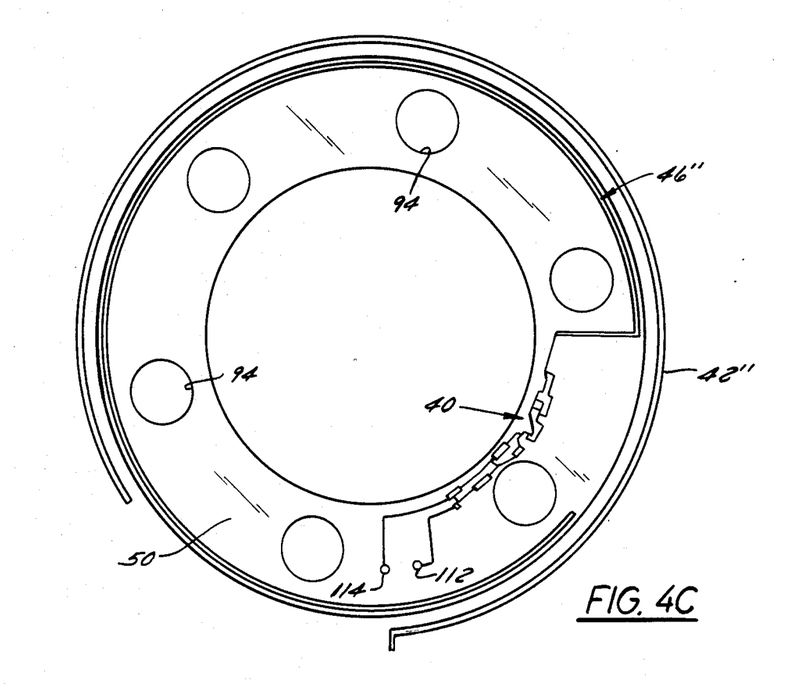
FIG. 4C is a view of a printed circuit board illustrating another embodiment of the invention having another type of rotating antenna and a stationary antenna adjacent the coupling.

In FIG. 4B, a stationary and rotating pair of antennas respectively identified by the numerals 42' and 46' and having a dipole configuration is illustrated. The antenna 42' has a mounted position extending partially around the coupling 2 and includes spaced apart ends 96 and 98 adjacent the coupling. The spacing of the ends is sufficient to permit movement of the antenna over the coupling to mount or remove the antenna. These antennas may have transmission "dead spots", however, at the normal rotating speeds of the rotary power source 4, the dead spots are of little consequence. On the other hand, this antenna configuration may not be suitable if there are problems of turning the shaft 8 of the power source 4 when the crack detecting apparatus is being installed or tested. Because the stationary dipole antenna does not entirely surround the flexible coupling 2, it is easier to install and remove and it thereby also simplifies installation and removal of the flexible coupling 2. A pair of stationary and rotating antennas respectively identified by the numerals 42" and 46" and having a monopole configuration are shown in FIG. 4B. The monopole antennas also have a "dead spot" problem, but are also relatively easy to install and remove from around the flexible coupling 2.

Figure 9:
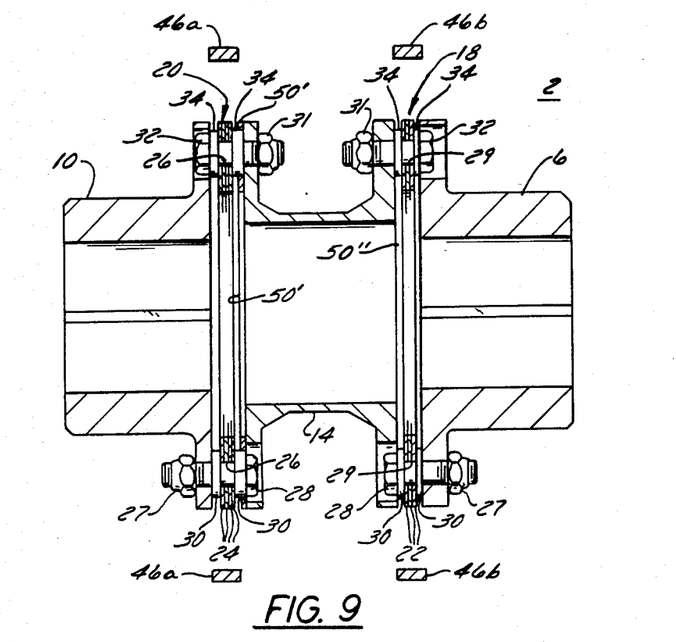
FIG. 9 illustrates an alternate embodiment of the invention having separate printed circuit boards and transponder circuits for different flexible discs.
Figure 10:
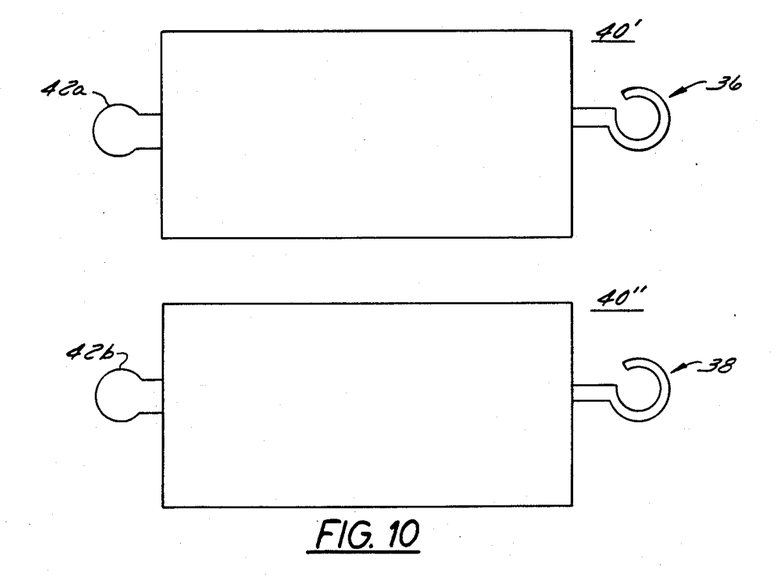
FIG. 10 illustrates the transponder circuits of the embodiment of the invention shwon in FIG. 9.

It also should be appreciated that two separate transponder circuits can be provided with the conductive lines 36 and 38 separately connected to a different one of each of the two transponder circuits. Thus, in FIGS. 9 and 10, an alternate embodiment of the invention is shown in which transponder circuits 40 and 40' are respectively mounted on printed circuit boards 50' and 50". The conductive line 36 is connected to the transponder circuit 40' and the conductive line 38 is connected to the transponder circuit 40". The transponder circuits 40', 40" and their respective antennas 42a and 42b operate in the same manner as transponder circuit 40 and antenna 42 transmit a modulated signal to stationary antennas 46a and 46b indicative of the continuous or discontinous condition of conductive lines 36 and 38. However, because the circuits are separate, it is possible to identify from the received signal the particular flexible member 18 and 20 which has a cracked disc.

It will be understood that the foregoing description of the present invention is for purposes of illustration only and that the invention is susceptible to a number of modifications or changes, none of which entail any departure from the spirit and scope of the present invention as defined in the hereto appended claims.

What is claimed is:

1. An apparatus for detecting cracks in a flexible disc of a flexible coupling connected between a rotary power source and a device driven through the flexible coupling by the power source comprising:
    an electrically insulated conductive line on the flexible disc, the conductive line being normally continuous and being discontinuous upon cracking of the disc;
    first circuit means mounted on the coupling and connected to the conductive line for generating and transmitting a first signal while the conductive line is continuous and a second signal while the conductive line is discontinuous; and
    stationary second circuit means for receiving the first and second signals from the first circuit means and providing an indication of either the first signal or the second signal.

2. The apparatus according to claim 1 wherein:
    the second circuit means comprises second means for transmitting high frequency power to the first circuit means and receiving said first and second signals; and
    the first circuit means comprises a first means for generating the first and second signals utilizing the high frequency power and transmitting the first and second signals to the second circuit means.

3. The apparatus according to claim 1 wherein the first circuit means includes power source means mounted on the flexible coupling for providing power for the generation and transmitting of the first and second signals.

4. The apparatus according to claim 2 further comprising:
    a first antenna connected to the first circuit means and mounted on and rotatable with the flexible coupling for transmitting the first and second signals and receiving the high frequency power; and
    a second antenna connected to the second circuit means and positioned to transmit the high frequency power to the first antenna and receive the first and second signals from the first antenna.

5. The apparatus according to claim 4 further comprising:
    a circuit board mounted on the coupling; and wherein the first circuit means and the first antenna are affixed to the circuit board.

6. The apparatus according to claim 1, 2, 3, 4 or 5 wherein the flexible coupling has an angular position relative to the rotary power source and driven device, the angular position being the same both before and after the cracking of the disc.

7. The apparatus according to claim 1, 2, 3, 4 or 5 wherein the flexible coupling has an angular position relative to the rotary power source and driven device, and angular position being independent of the cracking of the disc.

8. The apparatus according to claim 5 wherein the first antenna is affixed along the outer periphery of the circuit board and the second antenna is positioned adjacent to the outer periphery of the circuit board.

9. The apparatus according to claim 4, 5 or 8 wherein the second antenna has at least one dead spot, the dead spot having a length in the rotational direction of the flexible coupling such that the interruption time of the high frequency power transmission to the first antenna due to the dead spot is insufficient to cause the first circuit means to cease generation and transmittal of the first or second signal when the coupling is rotating.

10. The apparatus according to claim 4, 5 or 8 wherein the second antenna has a mounted position extending partially around the flexible coupling and has spaced apart ends adjacent the coupling, the spacing of the ends being sufficient to permit movement of the second antenna over the coupling to the mounted position.

11. The apparatus according to claim 4, 5 or 8 wherein the second antenna is positioned around and adjacent to the outer periphery of the disc, the second antenna being removable from around the flexible coupling without removal of any components of the flexible coupling.

12. The apparatus according to claim 4, 6, 7 or 8 wherein the first and second antennas each comprise a loop antenna.

13. The apparatus according to claim 1, 2 or 3 wherein:
the flexible disc has a plurality of openings for use in attaching the disc to the flexible coupling;
the conductive line on the disc includes a portion entirely around at least one of said openings, said portion including two sections in parallel with each other and the portion as a whole being serially connected to the balance of the conductive line; and
the first circuit means generates said first signal when both of the conductive sections are continuous and said second signal when both of the conductive sections are discontinuous.

14. The apparatus according to claim 1, 2 or 3 wherein the conductive line includes a portion adjacent the outer periphery of the flexible disc and a portion adjacent the inner periphery of the flexible disc.

15. In a flexible coupling connected between a rotary power source and a device driven through the flexible coupling by the power source, the combination comprising:
flexible means comprising part of the flexible coupling and positioned between the power source and the driven device for transferring rotary power from the power source to the driven device and simultaneously accommodating misalignment of the power source and the driven device, the flexible means comprising a plurality of layered discs;
an electrically insulated conductive line on one of the flexible discs, the conductive line being normally continuous and being discontinuous upon cracking of the disc;
circuit means mounted on the coupling and connected to the conductive line for generating a signal indicative of the discontinuity of the conductive line and thus the cracking of said one flexible disc; and
the flexible means as a whole is intact after the cracking of the one flexible disc.

16. The combination according to claim 15 wherein the circuit means includes power source means mounted on the flexible coupling for providing power for the generation and transmitting of the first and second signals.

17. The combination according to claim 15 or 16 wherein the circuit means includes an antenna mounted on the flexible coupling for transmitting said signal away from the flexible coupling.

18. The combination according to claim 17 further comprising a stationary circuit means for receiving said signal and producing an indication of the discontinuity of the conductive line and including a stationary antenna positioned adjacent to the flexible coupling.

19. In a flexible coupling connected between a rotary power source and a device driven through the flexible coupling by the power source, the combination comprising:
first and second spaced apart flexible means comprising part of the flexible coupling and positioned between the power source and the driven device for transferring rotary power from the power source to the driven device and simultaneously accommodating misalignment of the power source and the driven device, each of the flexible means comprising a plurality of layered discs;
first and second electrically conductive lines respectively affixed to the first and second flexible means, each conductive line being normally continuous and being discontinuous upon the cracking of the disc to which it is affixed;
first and second circuit means mounted on the coupling and respectively connected to the first and second conductive lines for each generating and transmitting a first signal while the connected conductive line is continuous and a second signal while the connected conductive line is discontinuous; and
stationary circuit means for receiving the first and second signals from the first and second circuit means and providing an indication of either the first signal or the second signal.

* * * * *